United States Patent
Payne et al.

(10) Patent No.: US 10,895,234 B2
(45) Date of Patent: Jan. 19, 2021

(54) SYSTEMS AND METHODS FOR MANAGING FRESHNESS OF FUEL IN A VEHICLE

(71) Applicant: Toyota Motor Engineering & Manufacturing North America, Inc., Plano, TX (US)

(72) Inventors: Joshua D. Payne, Ann Arbor, MI (US); Heraldo F. Stefanon, Dexter, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 24 days.

(21) Appl. No.: 16/356,241

(22) Filed: Mar. 18, 2019

(65) Prior Publication Data

US 2020/0300204 A1    Sep. 24, 2020

(51) Int. Cl.
| | |
|---|---|
| F02N 11/08 | (2006.01) |
| F02D 41/26 | (2006.01) |
| G01C 21/34 | (2006.01) |
| G05D 1/02 | (2020.01) |
| B60K 6/22 | (2007.10) |

(52) U.S. Cl.
CPC .......... *F02N 11/0803* (2013.01); *F02D 41/26* (2013.01); *G01C 21/3476* (2013.01); *G05D 1/021* (2013.01); *B60K 6/22* (2013.01); *B60Y 2200/92* (2013.01); *B60Y 2300/192* (2013.01); *F02D 2200/0611* (2013.01); *F02D 2200/0625* (2013.01); *F02N 2200/02* (2013.01); *F02N 2200/0811* (2013.01); *F02N 2200/123* (2013.01)

(58) Field of Classification Search
CPC ......... F02N 11/0803; F02N 2200/0811; F02N 2200/123; F02N 2200/02; F02D 41/26; F02D 2200/0611; F02D 2200/0625; G05D 1/021; G01C 21/3476; B60Y 2300/192; B60Y 2200/92; B60K 6/22
See application file for complete search history.

(56) References Cited

U.S. PATENT DOCUMENTS

| | | | |
|---|---|---|---|
| 8,321,158 B2 | 11/2012 | Proefke et al. | |
| 9,008,880 B2* | 4/2015 | Sangameswaran | G01F 23/00 701/22 |
| 9,415,762 B2 | 8/2016 | Treharne et al. | |
| 9,688,270 B2* | 6/2017 | Amin | B60W 10/06 |
| 10,042,359 B1* | 8/2018 | Konrardy | B60W 30/12 |

(Continued)

OTHER PUBLICATIONS

Hall-Geisler, "Owners Who Are Happy When the Engine Doesn't Start," The New York Times, May 9, 2014, found at https://www.nytimes.com/2014/05/11/automobiles/owners-who-are-happy-when-the-engine-doesnt-start.html.

(Continued)

*Primary Examiner* — Joseph J Dallo
(74) *Attorney, Agent, or Firm* — Christopher G. Darrow; Darrow Mustafa PC

(57) ABSTRACT

Systems and methods described herein relate to managing the freshness of the fuel in a vehicle. One embodiment tracks a freshness level of the fuel in the vehicle as time passes; determines a fuel consumption plan based, at least in part, on a predetermined refueling schedule for the vehicle and the freshness level of the fuel in the vehicle; and activates an internal combustion engine of the vehicle automatically on one or more occasions in accordance with the fuel consumption plan to consume at least a portion of the fuel.

17 Claims, 8 Drawing Sheets

(56) References Cited

U.S. PATENT DOCUMENTS

| | | | |
|---|---|---|---|
| 10,088,316 B2 | 10/2018 | Dufford et al. | |
| 10,220,829 B2* | 3/2019 | Oonishi | B60K 6/20 |
| 2010/0161166 A1* | 6/2010 | Yamada | B60K 6/46 |
| | | | 701/22 |
| 2010/0300781 A1 | 12/2010 | Leone | |
| 2012/0047992 A1* | 3/2012 | Sasai | F02D 41/065 |
| | | | 73/23.32 |
| 2014/0018985 A1 | 1/2014 | Gupta et al. | |
| 2014/0114511 A1 | 4/2014 | Sangameswaran et al. | |

OTHER PUBLICATIONS

Moody, "Yes, the 2011 Chevy Volt Will Charge Its Battery via 'Mountain Mode'," Aug. 24, 2010, found at https://www.autoblog.com/2010/08/24/yes-the-2011-chevy-volt-will-charge-its-battery-via-mountain-m/.

Comment by Bill Howland on article "A Tale of Two Chevrolet Volts," circa 2015, found at https://insideevs.com/tale-two-chevrolet-volts/.

"Plug-In Hybrids and Range-Extended EVs Need to Keep Your Fuel Fresh—Here's How They Do It," found at http://bestride.com/news/technology/plug-in-hybrids-and-range-extended-evs-need-to-keep-your-fuel-fresh-heres-how-they-do-it, circa Jan. 2018.

Vogel et al., "Improving Hybrid Vehicle Fuel Efficiency Using Inverse Reinforcement Learning," Proceedings of the Twenty-Sixth AAAI Conference on Artificial Intelligence, 2012, found at http://ai.stanford.edu/~acvogel/papers/hybrid-irl.pdf.

\* cited by examiner

US 10,895,234 B2

SYSTEMS AND METHODS FOR MANAGING FRESHNESS OF FUEL IN A VEHICLE

TECHNICAL FIELD

The subject matter described herein relates in general to vehicles and, more specifically, to systems and methods for managing the freshness of the fuel in a vehicle.

BACKGROUND

Some of today's vehicles, such as plug-in hybrid electric vehicles (PHEVs), can be driven with or without the use of fuel (e.g., gasoline), depending on the mode in which the vehicle is driven. Such vehicles typically include a rechargeable battery that can be recharged by connecting it to an electrical outlet. Some users of PHEVs commute close enough to home that they can operate the vehicle in an exclusively electric operating mode (without fuel) for extended periods of time. After such an extended period (e.g., six months, eight months, or a year), the fuel that remains in the fuel tank can become stale. Fuel that becomes too stale may have greater pollutive effects when it is burned.

SUMMARY

An example of a system for managing the freshness of the fuel in a vehicle is presented herein. The system comprises one or more processors and a memory communicably coupled to the one or more processors. The memory stores a fuel status tracking module including instructions that when executed by the one or more processors cause the one or more processors to track a freshness level of the fuel in the vehicle as time passes. The memory also stores a stale-fuel consumption module including instructions that when executed by the one or more processors cause the one or more processors to determine a fuel consumption plan based, at least in part, on a predetermined refueling schedule for the vehicle and the freshness level of the fuel in the vehicle and to activate an internal combustion engine of the vehicle automatically on one or more occasions in accordance with the fuel consumption plan to consume at least a portion of the fuel.

Another embodiment is a method of managing the freshness of the fuel in a vehicle, the method comprising tracking a freshness level of the fuel in the vehicle as time passes; determining a fuel consumption plan based, at least in part, on a predetermined refueling schedule for the vehicle and the freshness level of the fuel in the vehicle; and activating an internal combustion engine of the vehicle automatically on one or more occasions in accordance with the fuel consumption plan to consume at least a portion of the fuel.

Another embodiment is a non-transitory computer-readable medium for managing the freshness of the fuel in a vehicle and storing instructions that when executed by one or more processors cause the one or more processors to track a freshness level of the fuel in the vehicle as time passes; determine a fuel consumption plan based, at least in part, on a predetermined refueling schedule for the vehicle and the freshness level of the fuel in the vehicle; and activate an internal combustion engine of the vehicle automatically on one or more occasions in accordance with the fuel consumption plan to consume at least a portion of the fuel.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
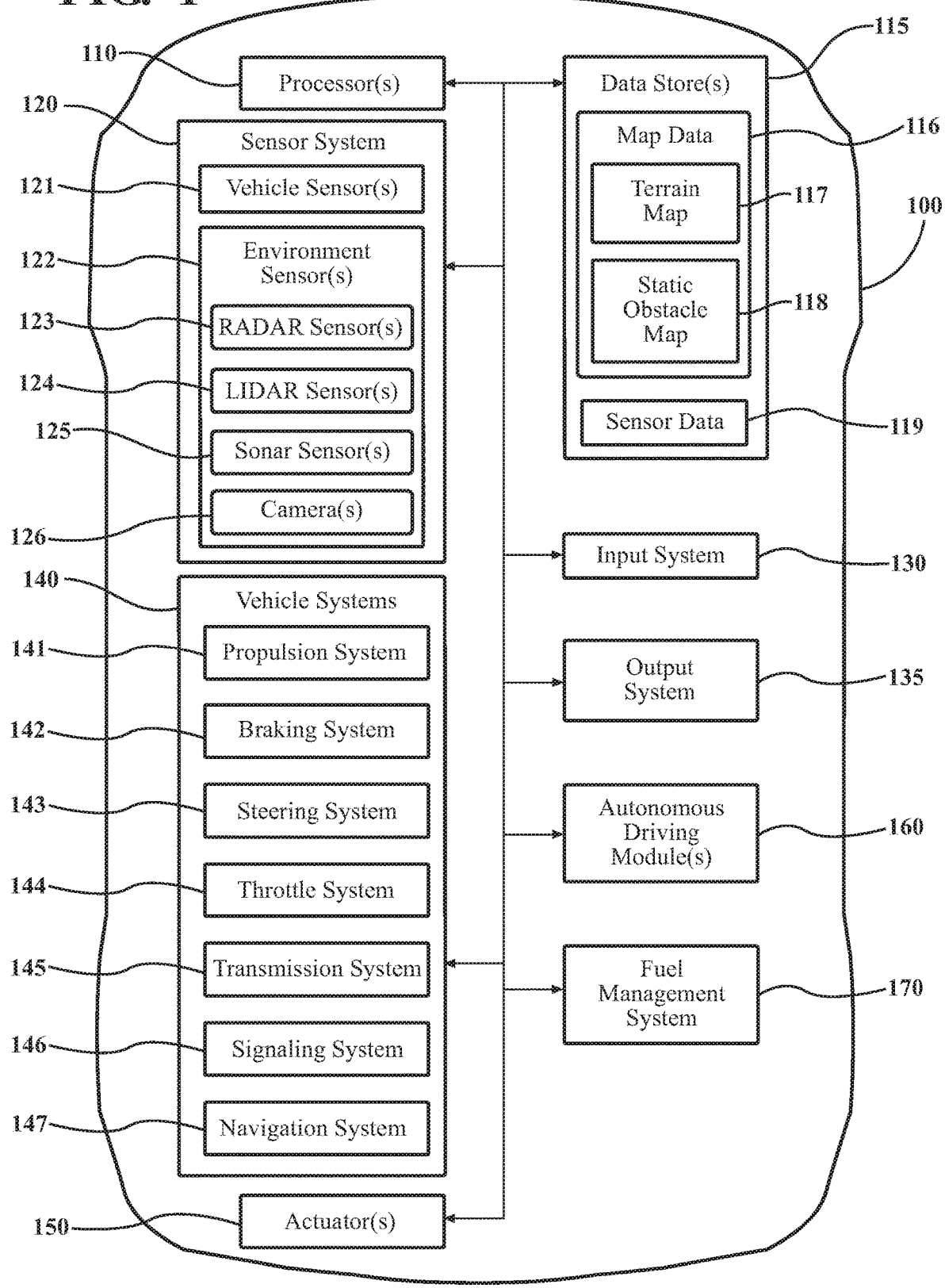
FIG. 1 illustrates one embodiment of a vehicle within which systems and methods disclosed herein may be implemented.

The embodiments described herein address the problem of fuel in a hybrid vehicle becoming stale due to the internal combustion engine (ICE) of the vehicle not being activated for an extended period during which the vehicle is operated in an electric-only mode. When fuel sits in the fuel tank for an extended period, the fuel deteriorates due to factors such as evaporation, oxidation, and contamination. This can happen, for example, with plug-in hybrid electric vehicles (PHEVs) where the owner resides relatively close to his or her place of work and there is rarely a need for the extended range that the ICE provides. Also, some PHEV owners intentionally operate their vehicles in the electric-only mode as much as possible out of a desire to reduce the impact of the vehicle on the environment.

The embodiments described herein provide systems and methods for managing the freshness of the fuel in a vehicle. Those embodiments establish a predetermined refueling schedule—specific future dates on which the vehicle is to be refilled with fresh fuel. The refueling schedule can be based on a variety of factors, including the particular type of fuel, climate, and user preferences. The embodiments described herein track the freshness level of the fuel in the vehicle as time passes and determine a fuel consumption plan based, at least in part, on the predetermined refueling schedule and the tracked freshness level of the fuel. The fuel consumption plan is a plan for consuming (burning) the fuel at a rate such that the vehicle is out of fuel or close to being out of fuel by the time the next scheduled refueling occurs in accordance with the predetermined refueling schedule. To that end, the embodiments described herein activate the vehicle's ICE automatically and intelligently on one or more occasions in accordance with the fuel consumption plan to consume at least a portion of the fuel.

In some embodiments, the vehicle is driven manually by a human driver, the destination is unknown, and the route the driver intends to take is also unknown. In such embodiments, route prediction can be used to select times and locations for activating the ICE that minimize inconvenience to the driver and/or make purposeful use of the energy generated by burning the fuel. Route prediction can be based, for example, on historical driving patterns, user calendar data (e.g., scheduled appointments), or a combination of those kinds of data.

In other embodiments, the vehicle operates in an autonomous driving mode with little or no human input or control. In those embodiments, a destination is, of course, known, and the fuel management system can take advantage of the predetermined route in conjunction with the fuel consumption plan to make purposeful use of the energy generated. For example, one embodiment identifies one or more portions of the predetermined route that require additional power compared with one or more other portions of the predetermined route and activates the ICE during the one or more portions of the predetermined route that require additional power.

In other embodiments, purposeful use is made of the heat and/or kinetic energy generated from automatically burning the fuel in accordance with the fuel consumption plan. For example, one embodiment employing route prediction automatically pre-heats the vehicle prior to a user's anticipated need for the vehicle (e.g., warming up the vehicle on a cold winter morning to protect components like the battery and to make the cabin comfortable just prior to the driver's regular morning commute). Another embodiment stores, in a thermal storage tank, heat energy generated by burning fuel in accordance with the fuel consumption plan and uses that stored heat energy to reduce the load on the vehicle's heating, ventilation, and air conditioning (HVAC) system. Yet another embodiment stores, in a flywheel, rotational energy generated by burning fuel in accordance with the fuel consumption plan while the vehicle's battery is being recharged and later uses the stored rotational energy to assist the vehicle's acceleration.

In some embodiments, the fuel management system determines a route to a refueling station, causes the vehicle to drive autonomously to the refueling station at a time that is in accordance with the predetermined refueling schedule, and causes the vehicle to refuel itself automatically at the refueling station.

Referring to FIG. 1, an example of a vehicle 100 is illustrated. As used herein, a "vehicle" is any form of motorized transport that can be powered by electricity from a battery, an internal combustion engine (ICE), or both in tandem. Such vehicles are commonly referred to as "hybrid electric vehicles" (HEVs), and those that can be recharged by plugging their battery into an electrical outlet are sometimes referred to as "plug-in hybrid electric vehicles" (PHEVs). In this description, the various types of hybrid vehicles will be referred to as simply "vehicles." In one or more implementations, the vehicle 100 is an automobile. While arrangements will be described herein with respect to automobiles, it will be understood that embodiments are not limited to automobiles. In some implementations, the vehicle 100 may be any other form of motorized transport. In some embodiments, vehicle 100 is driven manually by a human driver. In some of those embodiments, vehicle 100 does not include autonomous driving capability. In other embodiments, vehicle 100 is capable of operating in autonomous driving modes from Society of Automotive Engineers (SAE) Level 1 (driver assistance) up to Level 5 (fully automated driving, including unmanned driving).

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

The vehicle 100 includes a fuel management system 170 that is implemented to perform methods and other functions as disclosed herein relating to managing the freshness of the fuel in vehicle 100.

Figure 2:
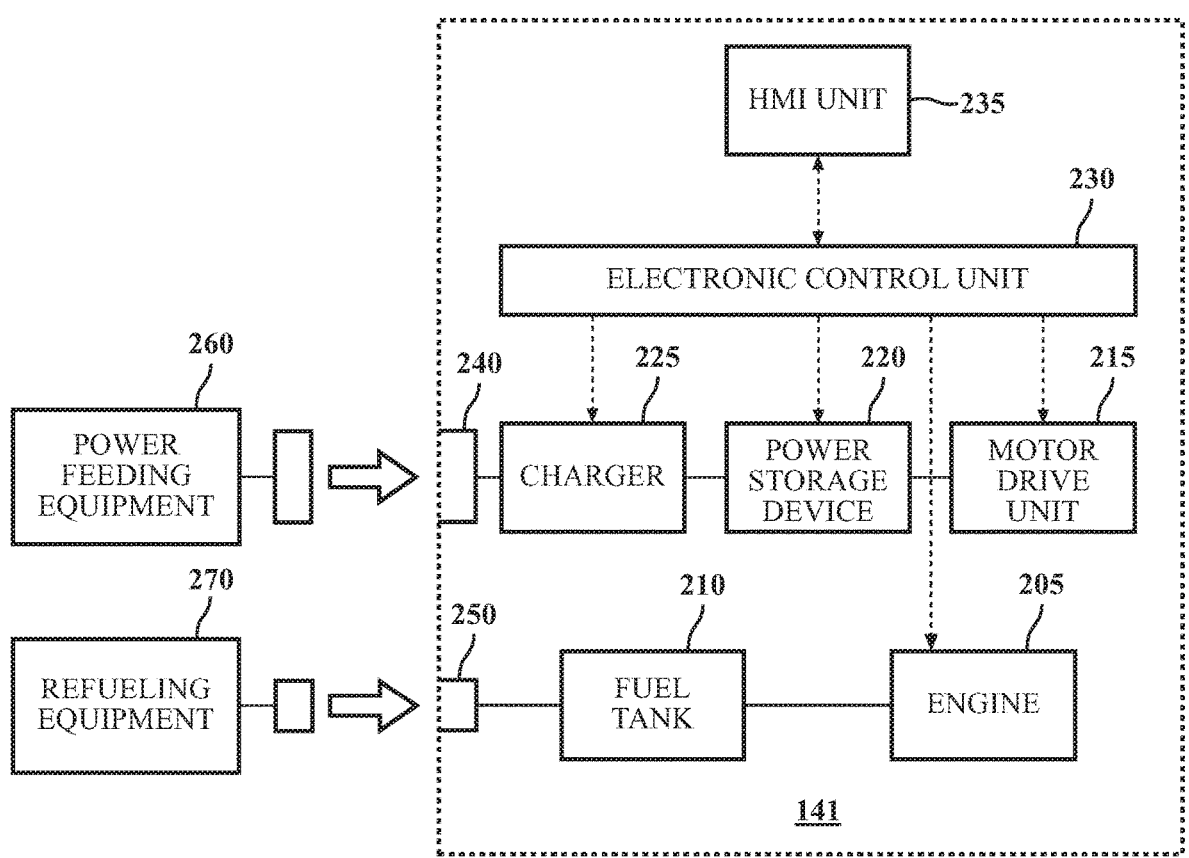
FIG. 2 illustrates one embodiment of a propulsion system of the vehicle illustrated in FIG. 1.

With reference to FIG. 2, one embodiment of a propulsion system 141 of vehicle 100 is further illustrated. Propulsion system 141 includes inlet 240, charger 225, electric power storage device 220, motor drive unit 215, Human Machine Interface (HMI) unit 235, electronic control unit 230, engine 205, fuel tank 210, and oil filler port 250.

The inlet 240 is configured to be connected to power feeding equipment 260 that is external to the vehicle. Charger 225 receives electric power for external charging from power feeding equipment 260. Charger 225 operates according to a control signal from the electronic control unit 230 to externally charge the power storage device 220. The power storage device 220 can be a secondary battery, such as a nickel hydride battery or a lithium-ion battery. The power storage device 220 can also be a large-capacity capacitor, in some embodiments.

The motor drive unit 215 generates vehicle driving force using electric power supplied from the power storage device 220. The motor drive unit 215 includes a motor generator mechanically connected to drive wheels (not shown in FIG. 2), and a power control unit (such as an inverter) that controls the amount of electric current passed through the motor-generator. The output of the motor drive unit 215 (i.e., the amount of electric current passed through the motor-generator) is controlled according to a control signal from the electronic control unit 230. The motor drive unit 215 may include one motor-generator or two or more motor-generators, depending on the embodiment.

The HMI unit 235 provides various kinds of information to the user and receives operations executed by the user. The HMI unit 235 includes one or more displays, speakers, etc., in the vehicle cabin. For example, a display and a speaker of navigation system 147 may also be used as HMI unit 235.

The oil filler port 250 is configured to be connected to the refueling equipment 270 outside the vehicle (e.g., at a refueling station). The fuel tank 210 stores fossil fuel (e.g., gasoline, light oil, or natural gas) supplied from the refueling equipment 270. The internal combustion engine ("engine" or "ICE") 205 generates power, using the fuel supplied from the fuel tank 210. The output of engine 205 is controlled according to a control signal from the electronic control unit 230. The engine 205 may be used for generating electric power, driving the vehicle, or both.

The electronic control unit 230, which includes at least one processor from the one or more processors 110 from the vehicle 100 of FIG. 1 and a memory (not shown in FIG. 2), controls each device (e.g., the charger 225, motor drive unit 215, HMI unit 235, and the engine 205) of vehicle 100, based on information stored in the memory and, in some embodiments, information from sensor system 120 and other vehicle systems.

In various embodiments, propulsion system 141 can operate in different modes. For example, in one mode that may be termed "motor drive mode" or "EV drive mode," propulsion system 141 propels vehicle 100 using only electric power from motor drive unit 215 (i.e., engine 205 is turned off). In another mode that may be termed "hybrid drive mode" or "HV drive mode," both the engine 205 and the motor drive unit 215 operate in tandem to propel vehicle 100. In other words, the power to drive the drive wheels is split between motor drive unit 215 and engine 205.

Figure 3:
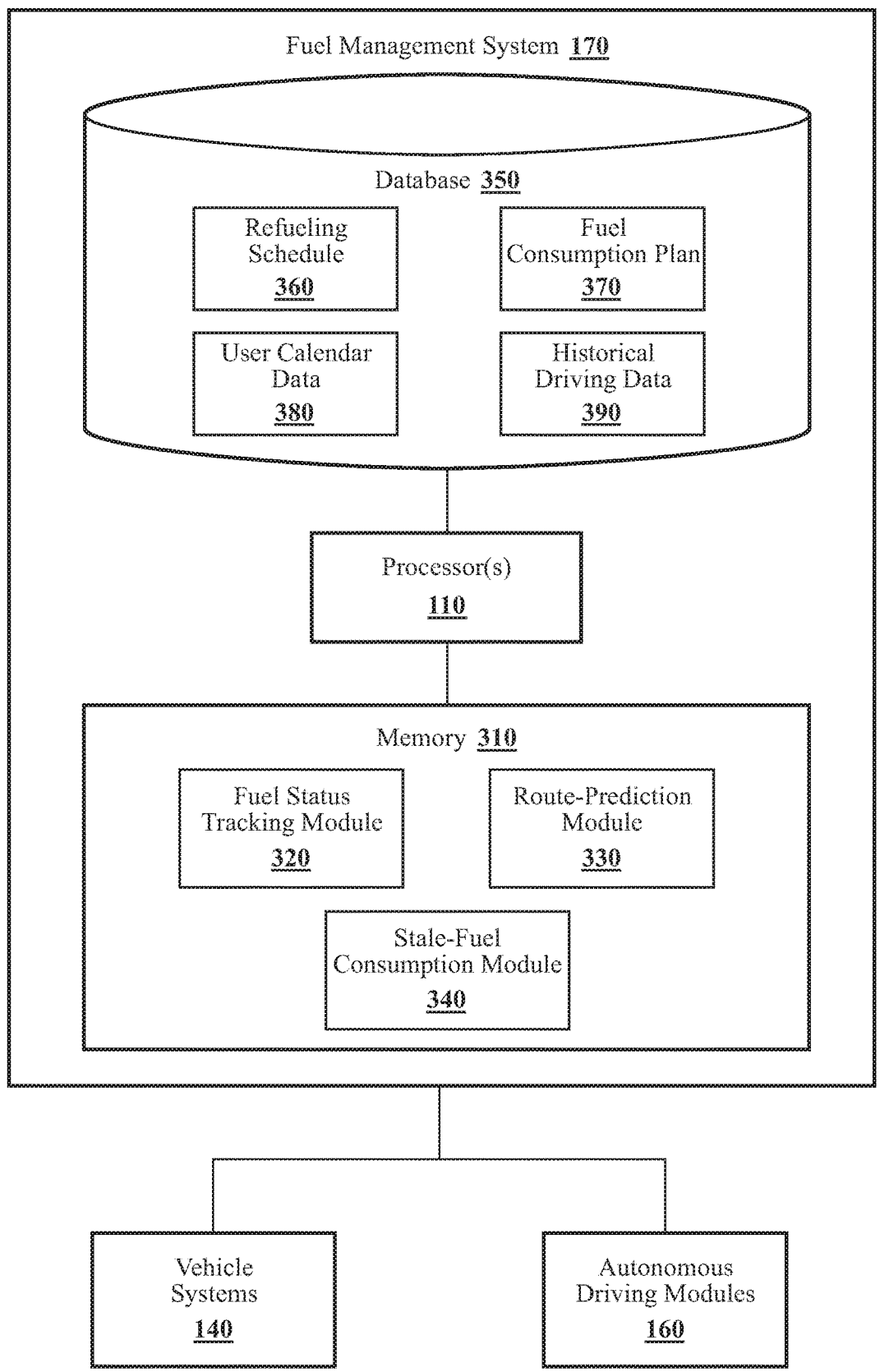
FIG. 3 illustrates one embodiment of a fuel management system of the vehicle illustrated in FIG. 1.

With reference to FIG. 3, one embodiment of the fuel management system 170 of FIG. 1 is further illustrated. The fuel management system 170 is shown as including one or more processors 110 from the vehicle 100 of FIG. 1. Accordingly, the one or more processors 110 may be a part of the fuel management system 170, the fuel management system 170 may include one or more separate processors from the one or more processors 110 of the vehicle 100, or the fuel management system 170 may access the one or more processors 110 through a data bus or another communication path, depending on the embodiment. In one embodiment, the fuel management system 170 includes a memory 310 that stores a fuel status tracking module 320, a route-prediction module 330, and a stale-fuel consumption module 340. The memory 310 is a random-access memory (RAM), read-only memory (ROM), a hard-disk drive, a flash memory, or other suitable memory for storing the modules 320, 330, and 340. The modules 320, 330, and 340 are, for example, computer-readable instructions that when executed by the one or more processors 110, cause the one or more processors 110 to perform the various functions disclosed herein.

In connection with managing the freshness of the fuel in vehicle 100 (in fuel tank 210), fuel management system 170 can store, in database 350, various kinds of data such as refueling schedule 360, fuel consumption plan 370, user calendar data 380, and historical driving data 390. Depending on the particular embodiment, these various kinds of data can be stored locally in vehicle 100, on a user's mobile device (not shown in FIG. 3), in the cloud (i.e., on one or more network servers accessible via the Internet or another network), or in a combination of these locations. As indicated in FIG. 2, fuel management system 170 can communicate with vehicle systems 140 and autonomous driving module(s) 160 (see FIG. 1).

Fuel status tracking module 320 generally includes instructions that cause the one or more processors 110 to track the freshness level of the fuel in the vehicle (in fuel tank 210) as time passes. Fuel status tracking module 320 "tracks" the freshness of the fuel in fuel tank 210 in the sense that it stores the freshness level in memory and updates the freshness level with the passage time (i.e., as the fuel in fuel tank 210 ages). The frequency with which the freshness level is updated can vary depending on the particular embodiment. In one embodiment, fuel status tracking module 320 updates its assessment of the freshness level each time a driver commences using vehicle 100. In other embodiments, fuel status tracking module 320 updates the freshness level at regular time intervals, which can be fine (e.g., seconds or minutes) or coarse (e.g., daily or weekly). In some embodiments, fuel status tracking module 320, in conjunction with assessing and storing the freshness level of the fuel in fuel tank 210, also monitors the amount of fuel remaining in fuel tank 210.

Depending on the particular embodiment, the freshness level of the fuel can be defined in a variety of ways. In one embodiment, fuel status tracking module 320 keeps track of how long the fuel has been in fuel tank 210 and assigns a decreasing freshness level to the fuel with the passage of time as it remains unburned in fuel tank 210. In some embodiments, the assigned freshness level is a numerical value. In other embodiments, the freshness level is a category (e.g., "fresh," "moderately fresh," "moderately stale," "stale," etc.). Since it is possible for newer fuel to be mixed with older fuel that remains in fuel tank 210, in the embodiments just discussed, fuel status tracking module 320, more generally, measures a time period that has elapsed since a most recent refueling of vehicle 100.

In other embodiments, more sophisticated techniques can be used to track the freshness of the fuel with the passage of time, particularly as vehicle 100 is refueled and newer fuel is mixed with older fuel. For example, a weighted average can be used to calculate an effective "fuel age," which can be easily converted to a measure of freshness. One example of such an implementation can be found in U.S. Pat. No. 8,321,158 B2, "Method and System for Monitoring Freshness of Fuel in Vehicles," to Proefke et al. ("Proefke"), the entire disclosure of which, except for any definitions, disclaimers, disavowals, and inconsistencies, is incorporated herein by reference. Proefke calculates the unweighted age of stored fuel as follows:

$$\text{Stored Fuel Age} = \text{Age at Last Fill} + (\text{Today's Date} - \text{Last Fill Date}) \quad \text{(Equation 1)},$$

in which the "Age at Last Fill" represents the fuel age calculated at the time fuel was most recently added to the fuel tank, "Today's Date" represents the current calendar date, and "Last Fill Date" represents the date on which fuel was most recently added to the fuel tank. Proefke calculates a weighted-average age of fuel that is a mixture of older and more recently added fuel as follows:

$$\text{Current Fuel Age} = (\text{Prior Level} * (\text{Stored Fuel Age})) / \text{New Fuel Level} \quad \text{(Equation 2)},$$

in which the "Prior Level" is the fuel level in the tank at a point in time prior to the most recent refueling, "Stored Fuel Age" corresponds to the unweighted stored fuel age computed using Equation 1, and "New Fuel Level" represents the fuel level in the tank after the most recent refueling. In essence, Proefke scales the Stored Fuel Age computed using Equation 1 by the ratio of the Prior Level to the New Fuel Level. Thus, adding new fuel to older fuel reduces the effective "age" of the resulting mixture. This weighted-average measure of age can be mapped to a freshness level.

How quickly the fuel in fuel tank 210 becomes stale depends on several factors that can differ with location and with the composition of the fuel itself. In some embodiments, fuel status tracking module 320 uses climate data, data pertaining to how often vehicle 100 cycles between predetermined temperature extremes (temperature-cycle data), or both in connection with assigning the freshness level to the fuel in fuel tank 210 as time passes.

As explained in further detail below, fuel management system 170 employs a predetermined refueling schedule 360 to pace the automatic consumption of fuel in fuel tank 210 so as to avoid the fuel becoming stale. That is, refueling schedule 360 permits a fuel-consumption rate to be determined that guides consuming fuel automatically before it becomes stale. The freshness-level tracking that fuel status tracking module 320 performs serves as an additional input that can be taken into account by stale-fuel consumption module 340 as stale-fuel consumption module 340 automatically activates engine 205 on one or more occasions to consume fuel in accordance with fuel consumption plan 370. For example, such information regarding the freshness of the fuel in fuel tank 210 can be used to dynamically update the refueling schedule 360 and/or the fuel consumption plan 370, if needed.

Route-prediction module 330 generally includes instructions that cause the one or more processors 110 to determine a predicted route of vehicle 100 while vehicle 100 is operating in a manual driving mode in which a human driver controls steering, braking, and acceleration. In such embodiments, navigation system 147 of vehicle 100 is not informed of the driver's intended destination, nor is navigation system 147 informed of a specific route to the intended destination. In such cases, route-prediction module 330 can predict the route of vehicle 100 based on historical driving patterns (historical driving data 390), user calendar data 380 (e.g., scheduled appointments), or both. Once route-prediction module 330 has predicted a likely destination and associated route, stale-fuel consumption module 340 can use that information in deciding when to activate engine 205 automatically on one or more occasions in accordance with the fuel consumption plan to consume at least a portion of the fuel. More specifically, stale-fuel consumption module 340 can activate engine 205 on a particular one of the one or more occasions based, at least in part, on the predicted route of vehicle 100 that route-prediction module 330 determines on that occasion.

Route-prediction module 330 can perform route prediction using a variety of techniques, depending on the particular embodiment. In general, route-prediction module 330 aids stale-fuel consumption module 340 in selecting times for activating engine 205 that minimize inconvenience to a vehicle owner or driver and/or that purposefully use the energy generated by burning the fuel. One illustrative implementation of route prediction can be found in U.S. Pat. No. 10,088,316 B2, "Navigation Systems and Vehicles for Predicting Routes," to Dufford et al. ("Dufford"), the entire disclosure of which, except for any definitions, disclaimers, disavowals, and inconsistencies, is incorporated herein by reference. Dufford stores historical route data in a static database and/or a dynamic database. The static database includes geographical information pertaining to previously traveled routes and the segments that make up those routes. The dynamic database includes temporal information regarding when particular routes or segments were traveled. Dufford detects when the vehicle has made a turn based on measured changes in heading, adds an associated segment to a segment list, and predicts a route based on the segment list.

In other embodiments, probabilistic techniques can be used to perform route prediction.

Stale-fuel consumption module 340 generally includes instructions that cause the one or more processors 110 to (1) determine a fuel consumption plan based, at least in part, on the predetermined refueling schedule 360 for vehicle 100 and the freshness level of the fuel in fuel tank 210 and (2) activate an internal combustion engine of the vehicle automatically on one or more occasions in accordance with the fuel consumption plan to consume at least a portion of the fuel.

As discussed above, the fuel consumption plan 370 is a plan for consuming (burning) the fuel in fuel tank 210 at a rate such that vehicle 100 is out of fuel or nearly out of fuel by the time the next scheduled refueling occurs in accordance with the predetermined refueling schedule 360. Refueling schedule 360 can be determined flexibly based on a number of factors, depending on the particular embodiment. One factor is general information about how long fuel of a particular type and composition generally remains "fresh." In other words, the predetermined refueling schedule 360 can be based, at least in part, on a known, calculated, or predicted period of time after which the fuel in fuel tank 210 becomes "stale." That general information can be augmented by more specific information regarding the local climate and conditions where vehicle 100 is driven most of the time. In embodiments in which vehicle 100 is driven manually by a human driver, user preferences for the frequency of refueling can also be incorporated. For example, a vehicle owner might prefer that vehicle 100 operate in EV drive mode as much as possible. In such a case, stale-fuel consumption module 340 can select a refueling schedule 360 in which refueling is spaced as far apart in time as possible without the fuel becoming unacceptably stale. In embodiments in which vehicle 100 operates in an autonomous driving mode much of the time, stale-fuel consumption module 340 can automatically select a refueling schedule 360 that balances various factors pertaining to fuel type and composition, local climate, temperature-cycle data, environmental impact, etc.

Fuel consumption plan 370 can take on a variety of forms, depending on the particular embodiment. In one embodiment, fuel consumption plan 370 is initially generated as a linear function of time based on the refueling schedule 360 and the freshness level of the fuel in fuel tank 210 determined by fuel status tracking module 320. As discussed above, the freshness-level tracking that fuel status tracking module 320 performs serves as an additional input that can be taken into account by stale-fuel consumption module 340 as stale-fuel consumption module 340 generates a fuel consumption plan 370. For example, such information regarding the freshness of the fuel in fuel tank 210 can be used to dynamically update the refueling schedule 360 and/or the fuel consumption plan 370, if needed.

In most cases, a linear fuel consumption plan 370 is only an approximation. Burning a precise amount of fuel in a regular, periodic fashion (e.g., every day or every n days) to satisfy a linear fuel consumption plan 370 is often neither achievable nor desirable. Instead, a linear fuel consumption plan 370 can be used as a point of departure, and compensations and adjustments can be made dynamically as needed to approximately follow a linear consumption characteristic over time. For example, in embodiments employing route prediction via route-prediction module 330, historical usage patterns of vehicle 100 can be used to aid stale-fuel consumption module 340 in its choice of when to activate engine 205 to consume fuel. More specifically, if a user habitually does not use vehicle 100 on weekends, stale-fuel consumption module 340 can take that predictable period of idleness into account in planning when to activate engine 205 to consume fuel in accordance with fuel consumption plan 370. For example, more fuel can be consumed prior to or following the period of idleness to track the desired approximately linear fuel consumption plan 370.

In other embodiments, a nonlinear fuel consumption plan 370 can be employed. Such a fuel consumption plan 370 can take into account, for example, nonlinearity in the rate at which the fuel becomes stale over time.

As discussed above, stale-fuel consumption module 340 activates engine 205 automatically on one or more occasions in accordance with the fuel consumption plan to consume at least a portion of the fuel in fuel tank 210. As also discussed above, in some embodiments, stale-fuel consumption module 340 activates engine 205 on a particular one of the one or more occasions based, at least in part, on a predicted route of vehicle 100 that route-prediction module 330 predicts. The predicted route permits stale-fuel consumption module 340 to select specific times for activating engine 205 that cause minimal inconvenience to the vehicle owner or driver, that make purposeful use of the energy generated, or that in some other way further the realization of fuel consumption plan 370. Within the guidelines that follow from fuel consumption plan 370 (e.g., an approximately linear fuel consumption rate as a function of time, in one embodiment), stale-fuel consumption module 340 can choose the specific times for activating engine 205 based, at least in part, on the predicted route. For example, if the predicted route exceeds the normal distance that vehicle 100 can travel in EV drive mode or includes stretches where greater power is required (e.g., high-speed freeway driving or hill climbing), stale-fuel consumption module 340 can activate engine 205 during the portions of the predicted route that require additional power. This is an example of making purposeful use of the energy generated from consuming the fuel in accordance with fuel consumption plan 370.

As also discussed above, in some embodiments route prediction encompasses predicting periods of vehicle use and idleness based on historical usage patterns (historical driving data 390) and/or user calendar data 380. Predicting such periods of use and idleness permits stale-fuel consumption module 340 to select specific times for activating engine 205 to consume fuel that might otherwise become stale over time.

In one embodiment, stale-fuel consumption module 340 uses a knowledge of a vehicle owner's or driver's historical usage patterns obtained from route-prediction module 330 to prepare vehicle 100 prior to an anticipated use. For example, stale-fuel consumption module 340, when informed by route-prediction module 330 that a driver will begin a daily commute 30 minutes in the future and that the ambient (outdoor) temperature is 17 degrees Fahrenheit, can pre-heat the components (e.g., power storage device 220) and cabin of vehicle 100 by activating engine 205 ahead of time, when doing so is consistent with fuel consumption plan 370. This is another example of stale-fuel consumption module 340 making purposeful use of the energy generated from the burning of fuel to prevent the fuel from becoming stale.

Another example of purposefully using the energy generated as engine 205 is activated automatically on one or more occasions in accordance with fuel consumption plan 370 is storing generated heat energy in a thermal storage tank. Such thermal storage tanks are well known in the art, and the stored heat energy can be used to reduce the load on a heating, ventilation, and air conditioning (HVAC) system of vehicle 100. In some embodiments, stale-fuel consumption module 340 causes the one or more processors 110 to interface with the necessary hardware systems of vehicle 100 to perform this function.

Yet another example of purposefully using the energy generated as engine 205 is activated automatically on one or more occasions in accordance with fuel consumption plan 370 is storing rotational energy in a flywheel. Flywheels are well known in the mechanical arts. The stored rotational energy can be used subsequently to assist the acceleration of vehicle 100. In some embodiments, stale-fuel consumption module 340 causes the one or more processors 110 to interface with the necessary hardware systems of vehicle 100 to perform this function.

As discussed above, in some embodiments, vehicle 100 is capable of operating in a highly or fully autonomous driving mode (e.g., Level 4 or 5). In such embodiments, a destination for vehicle 100 is known a priori, and at least a tentative planned route is also generally known. In these embodiments, stale-fuel consumption module 340 can receive a predetermined route from navigation system 147 and base the decision of when to activate engine 205 to consume fuel for the purpose of maintaining fuel freshness, at least in part, on the predetermined route. For example, in one embodiment, stale-fuel consumption module 340 identifies one or more portions of the predetermined route that require additional power compared with one or more other portions of the predetermined route. Stale-fuel consumption module 340 can make purposeful use of the energy by activating engine 205 during the one or more portions of the predetermined route that require additional power. Such opportunities can arise in connection with high-speed travel, long-range travel, hill climbing, etc.

In some embodiments involving a high level of autonomous driving, particularly unmanned Level-5 driving, stale-fuel consumption module 340, with the aid of navigation system 147, can determine a route to a refueling station. Once a route has been determined, stale-fuel consumption module 340, via autonomous driving module(s) 160, can cause vehicle 100 to travel autonomously to the refueling station via the determined route at a time that is in accordance with the predetermined refueling schedule 360. Stale-fuel consumption module 340 can then interface with refueling equipment 270 to cause vehicle 100 to be refueled automatically (e.g., by a robotic apparatus or by a human attendant).

Figure 4:
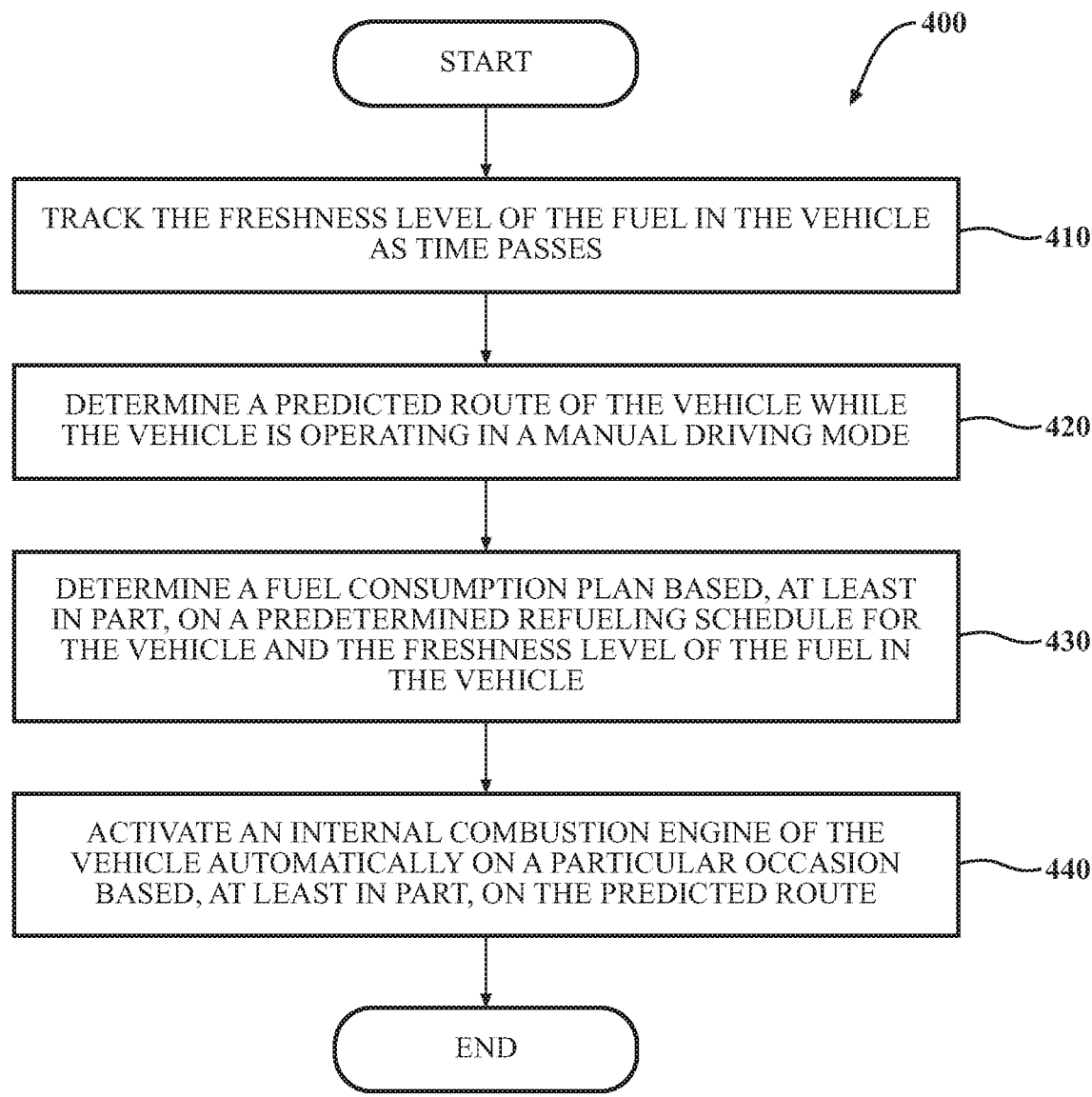
FIG. 4 is a flowchart of a method of managing the freshness of the fuel in a vehicle, in accordance with an illustrative embodiment of the invention.

FIG. 4 is a flowchart of a method 400 of managing the freshness of the fuel in a vehicle 100, in accordance with an illustrative embodiment of the invention. Method 400 will be discussed from the perspective of fuel management system 170 in FIG. 3. While method 400 is discussed in combination with fuel management system 170, it should be appreciated that method 400 is not limited to being implemented within fuel management system 170, but fuel management system 170 is instead one example of a system that may implement method 400.

At block 410, fuel status tracking module 320 tracks the freshness level of the fuel in vehicle 100 as time passes, as discussed above. In one embodiment, fuel status tracking module 320 measures a time period that has elapsed since a most recent refueling of vehicle 100. Based on the elapsed period and other information about the composition of the fuel, climate data, and/or temperature-cycle data, fuel status tracking module 320 can assign a freshness level to the fuel as a numerical value or as category, as discussed above. In some embodiments, more sophisticated techniques are used to account for the mixture of old and new fuel as vehicle 100 is refueled (e.g., a weighted average), as discussed above.

At block 420, route-prediction module 330 determines a predicted route of vehicle 100 while vehicle 100 is operating in a manual driving mode. Route prediction can be based, for example, on user calendar data 380, historical driving data 390, or both, depending on the embodiment. As discussed above, route prediction can also encompass predicting periods of vehicle use and idleness.

At block 430, stale-fuel consumption module 340 determines a fuel consumption plan based, at least in part, on a predetermined refueling schedule 360 for vehicle 100 and the freshness level of the fuel in the vehicle output by fuel status tracking module 320. One basic objective of the fuel consumption plan 370 is to consume the fuel at a rate such that the fuel in fuel tank 210 is nearly or completely used up by the time the next scheduled refueling occurs in accordance with refueling schedule 360. This can be done is a variety of ways, as discussed above. In one embodiment, an approximately linear consumption rate as a function of time is followed that includes compensation for periods during which vehicle 100 is not driven. Such periods of idleness are, in some embodiments, predicted by route-prediction module 330 based on historical driving data 390, user calendar data 380, or both.

At block 440, stale-fuel consumption module 340 activates engine 205 of vehicle 100 automatically on one or more occasions in accordance with the fuel consumption plan 370 to consume at least a portion of the fuel in fuel tank 210 on each occasion. Further, in some embodiments, stale-fuel consumption module 340 activates engine 205 on a particular one of the one or more occasions based, at least in part, on the predicted route of vehicle 100 obtained in connection with block 420. Route prediction assists stale-fuel consumption module 340 in activating engine 205 at times that minimize inconvenience to the driver and/or that purposefully use the energy generated from burning the fuel.

Some embodiments do not include route prediction. In those embodiments, the action in block 420 and basing activation of engine 205 on a predicted route are omitted from method 400.

Figure 5:
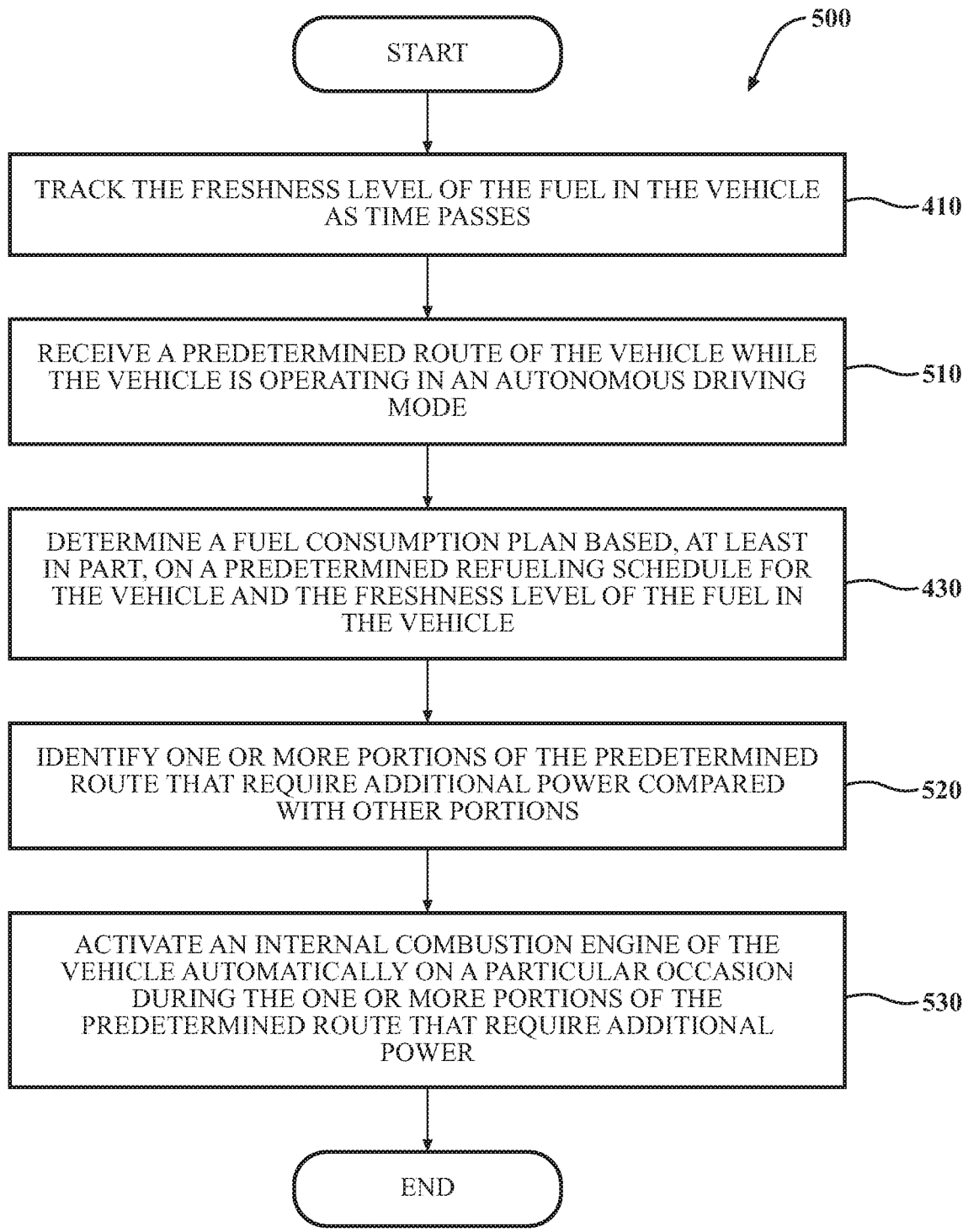
FIG. 5 is a flowchart of a method of method of managing the freshness of the fuel in a vehicle, in accordance with another illustrative embodiment of the invention.

FIG. 5 is a flowchart of a method 500 of managing the freshness of the fuel in a vehicle 100, in accordance with an illustrative embodiment of the invention. Method 500 will be discussed from the perspective of fuel management system 170 in FIG. 3. While method 500 is discussed in combination with fuel management system 170, it should be appreciated that method 500 is not limited to being implemented within fuel management system 170, but fuel management system 170 is instead one example of a system that may implement method 500.

Block 410 corresponds to a block discussed above in connection with FIG. 4. At block 510, stale-fuel consumption module 340 receives, from navigation system 147, a predetermined route of vehicle 100 while vehicle 100 is operating in an autonomous driving mode. The predetermined route can, for example, be the result of a passenger in vehicle 100 inputting a destination to navigation system 147. Block 430 corresponds to a block discussed above in connection with FIG. 4.

At block 520, stale-fuel consumption module 340 identifies one or more portions of the predetermined route that require additional power compared with one or more other portions of the predetermined route. Examples include portions of the route involving hill climbing or high-speed freeway travel.

At block 530, stale-fuel consumption module 340 activates engine 205 automatically on one or more occasions in accordance with the fuel consumption plan 370 to consume at least a portion of the fuel in fuel tank 210 on each occasion. Further, in this embodiment, stale-fuel consumption module 340 activates engine 205 on a particular one of the one or more occasions based, at least in part, on the predetermined route of vehicle 100 such that engine 205 is activated during the one or more portions of the predetermined route identified in block 520 that require additional power. As discussed above, this is an example of choosing the time of engine activation intelligently so as to make purposeful use of the energy produced from burning the fuel to prevent its becoming stale.

Figure 6:
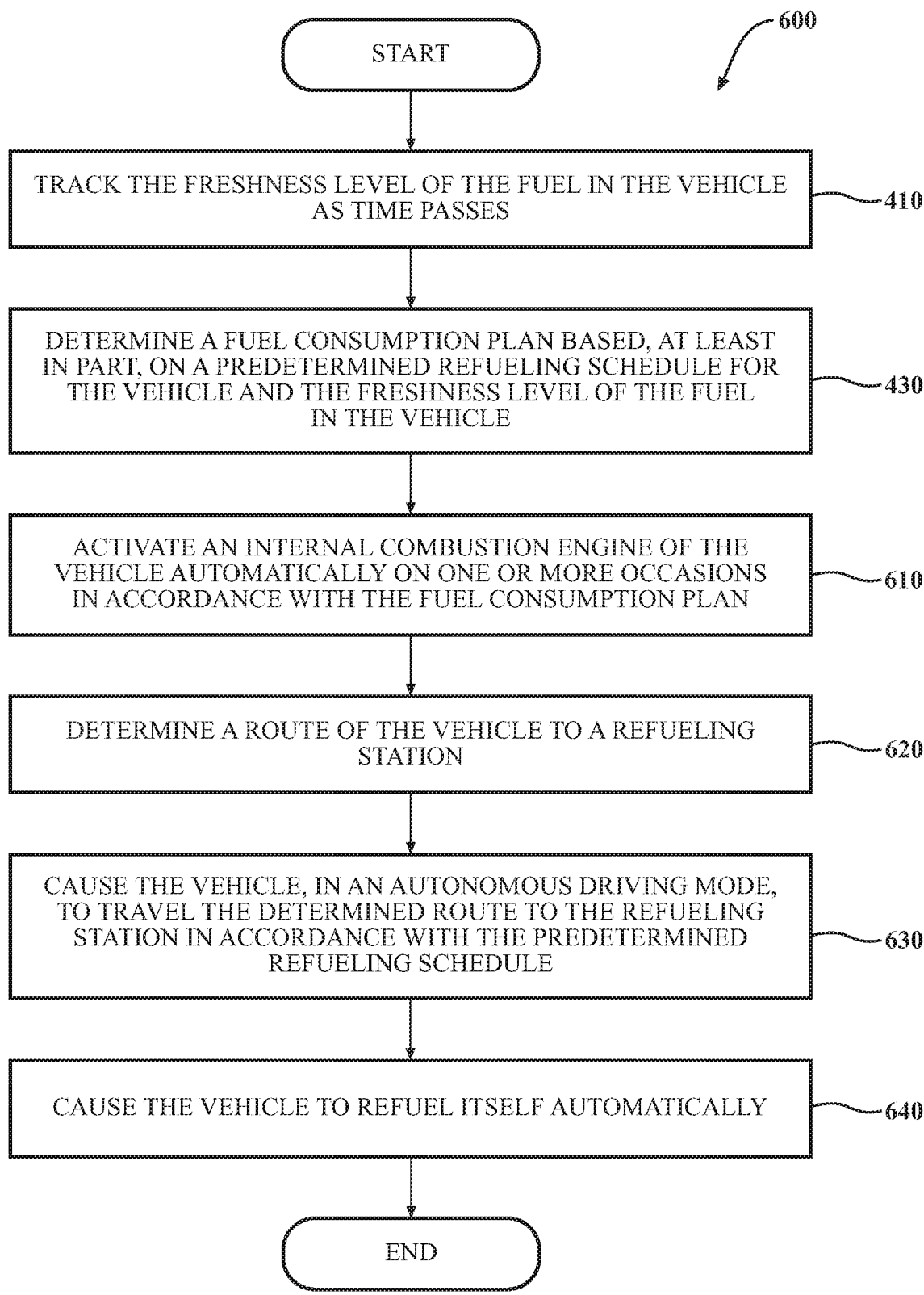
FIG. 6 is a flowchart of a method of method of managing the freshness of the fuel in a vehicle, in accordance with another illustrative embodiment of the invention.

FIG. 6 is a flowchart of a method 600 of managing the freshness of the fuel in a vehicle 100, in accordance with an illustrative embodiment of the invention. Method 600 will be discussed from the perspective of fuel management system 170 in FIG. 3. While method 600 is discussed in combination with fuel management system 170, it should be appreciated that method 600 is not limited to being implemented within fuel management system 170, but fuel management system 170 is instead one example of a system that may implement method 600.

Blocks 410 and 430 corresponds to blocks discussed above in connection with FIG. 4. At block 610, stale-fuel consumption module 340 activates engine 205 automatically on one or more occasions in accordance with the fuel consumption plan 370 to consume at least a portion of the fuel in fuel tank 210 on each occasion. Factors influencing how those occasions are chosen include, for example, user convenience and/or making purposeful use of the energy generated, as discussed above.

At block 620, stale-fuel consumption module 340 determines a route to a refueling station with the assistance of navigation system 147. At block 630, stale-fuel consumption module 340 causes vehicle 100, in an autonomous driving mode (e.g., Level 5), to travel the determined route to the refueling station at a time that is in accordance with the predetermined refueling schedule 360. At block 640, stale-fuel consumption module 340 causes vehicle 100 to refuel itself automatically by interfacing with refueling equipment 270, as discussed above.

Figure 7:
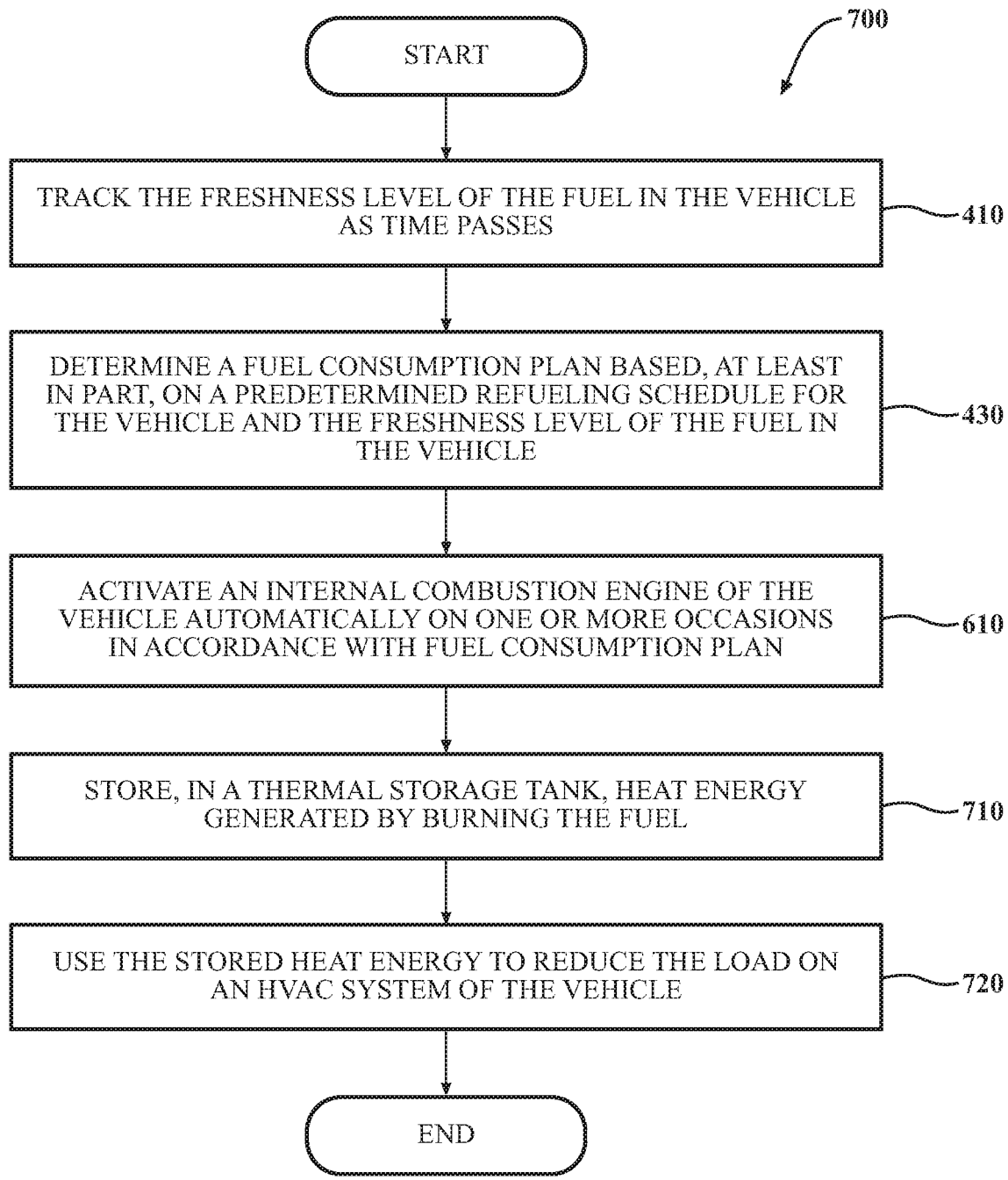
FIG. 7 is a flowchart of a method of method of managing the freshness of the fuel in a vehicle, in accordance with another illustrative embodiment of the invention.

FIG. 7 is a flowchart of a method 700 of managing the freshness of the fuel in a vehicle 100, in accordance with an illustrative embodiment of the invention. Method 700 will be discussed from the perspective of fuel management system 170 in FIG. 3. While method 700 is discussed in combination with fuel management system 170, it should be appreciated that method 700 is not limited to being implemented within fuel management system 170, but fuel management system 170 is instead one example of a system that may implement method 700.

Blocks 410 and 430 correspond to blocks discussed above in connection with FIG. 4. Block 610 corresponds to a block discussed above in connection with FIG. 6. At block 710, stale-fuel consumption module 340 causes the one or more processors 110 to store, in a thermal storage tank, heat energy generated in conjunction with activating engine 205 automatically on one or more occasions in accordance with the fuel consumption plan 370. At block 720, stale-fuel consumption module 340 causes the one or more processors 110 to use the stored heat energy to reduce the load on the HVAC system of vehicle 100.

Figure 8:
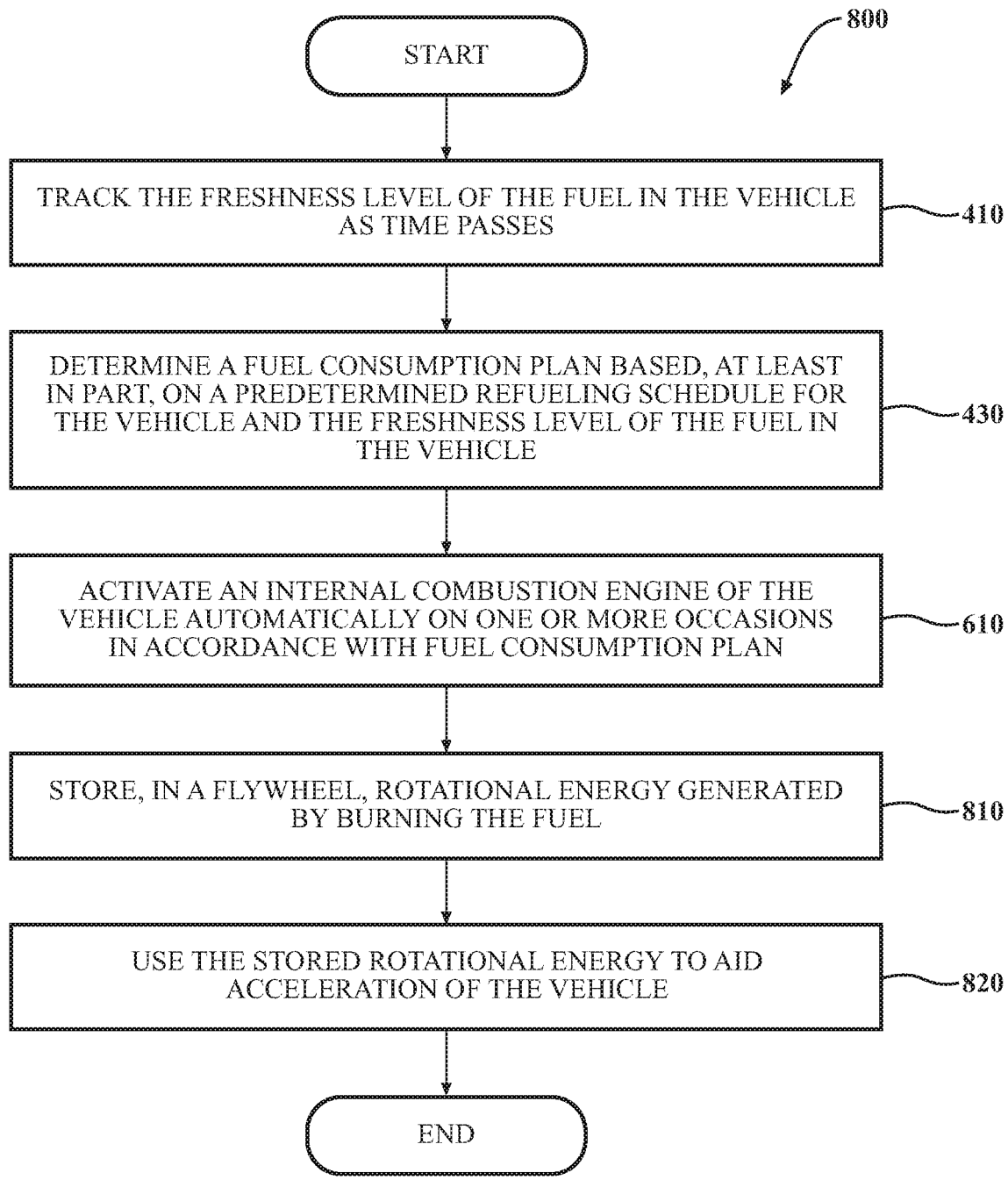
FIG. 8 is a flowchart of a method of method of managing the freshness of the fuel in a vehicle, in accordance with yet another illustrative embodiment of the invention.

FIG. 8 is a flowchart of a method 800 of managing the freshness of the fuel in a vehicle 100, in accordance with an illustrative embodiment of the invention. Method 800 will be discussed from the perspective of fuel management system 170 in FIG. 3. While method 800 is discussed in combination with fuel management system 170, it should be appreciated that method 800 is not limited to being implemented within fuel management system 170, but fuel management system 170 is instead one example of a system that may implement method 800.

Blocks 410 and 430 correspond to blocks discussed above in connection with FIG. 4. Block 610 corresponds to a block discussed above in connection with FIG. 6. At block 810, stale-fuel consumption module 340 causes the one or more processors 110 to store, in a flywheel, rotational energy generated in conjunction with activating engine 205 automatically on one or more occasions in accordance with the fuel consumption plan 370. At block 820, stale-fuel consumption module 340 causes the one or more processors 110 to use the stored rotational energy to aid the acceleration of vehicle 100.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator). In some embodiments, as discussed above, vehicle 100 does not include autonomous driving capability. That is, it is always driven manually by a human driver.

In one or more other embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous module 160 fails to properly respond or is otherwise unable to adequately control the vehicle 100. As discussed above, in other embodiments, vehicle 100 operates at a higher level of autonomy, including SAE Levels 4 and 5.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the fuel management system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the fuel management system 170, and/or the autonomous driving module(s) 160 may control some or all of these vehicle systems 140 and, thus, may be partially or fully autonomous.

The processor(s) 110, the fuel management system 170, and/or the autonomous driving module(s) 160 can be operably connected to communicate with the various vehicle systems 140 and/or individual components thereof. For example, returning to FIG. 1, the processor(s) 110, the fuel management system 170, and/or the autonomous driving module(s) 160 can be in communication to send and/or receive information from the various vehicle systems 140 to control the movement, speed, maneuvering, heading, direction, etc. of the vehicle 100. The processor(s) 110, the fuel management system 170, and/or the autonomous driving module(s) 160 may control some or all of these vehicle systems 140.

The processor(s) 110, the fuel management system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the fuel management system 170, and/or the autonomous driving module(s) 160 can control the direction and/or speed of the vehicle 100. The processor(s) 110, the fuel management system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the fuel management system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for managing freshness of fuel in a vehicle, the system comprising:
   one or more processors; and
   a memory communicably coupled to the one or more processors and storing:
   a fuel status tracking module including instructions that when executed by the one or more processors cause the one or more processors to:
   track a freshness level of a fuel in the vehicle as time passes;
   a route-prediction module including instructions that when executed by the one or more processors cause the one or more processors to determine a predicted route of the vehicle while the vehicle is operating in a manual driving mode by analyzing at least one of historical driving patterns and user calendar data; and
   a stale-fuel consumption module including instructions that when executed by the one or more processors cause the one or more processors to:
   determine a fuel consumption plan based, at least in part, on a predetermined refueling schedule for the vehicle and the freshness level of the fuel in the vehicle; and
   activate an internal combustion engine of the vehicle automatically on one or more occasions in accordance with the fuel consumption plan to consume at least a portion of the fuel, wherein a particular one of the one or more occasions is selected based, at least in part, on the predicted route of the vehicle.

2. The system of claim 1, wherein the stale-fuel consumption module includes further instructions to pre-heat the vehicle prior to a user's anticipated need for the vehicle on the particular one of the one or more occasions.

3. The system of claim 1, wherein the stale-fuel consumption module includes further instructions to:
   receive a predetermined route of the vehicle while the vehicle is operating in an autonomous driving mode; and
   activate the internal combustion engine of the vehicle on a particular one of the one or more occasions based, at least in part, on the predetermined route.

4. The system of claim 3, wherein the stale-fuel consumption module includes further instructions to:
  identify one or more portions of the predetermined route that require additional power compared with one or more other portions of the predetermined route; and
  activate the internal combustion engine of the vehicle during the one or more portions of the predetermined route that require additional power.

5. The system of claim 1, wherein the stale-fuel consumption module includes further instructions to:
  determine a route of the vehicle to a refueling station;
  cause the vehicle, in an autonomous driving mode, to travel the determined route to the refueling station at a time that is in accordance with the predetermined refueling schedule; and
  cause the vehicle to refuel itself automatically at the refueling station.

6. The system of claim 1, wherein the stale-fuel consumption module includes further instructions to:
  store, in a thermal storage tank, heat energy generated in conjunction with activating the internal combustion engine of the vehicle automatically on one or more occasions in accordance with the fuel consumption plan; and
  use the stored heat energy to reduce a load on a heating, ventilation, and air conditioning (HVAC) system of the vehicle.

7. The system of claim 1, wherein the stale-fuel consumption module includes further instructions to:
  store, in a flywheel, rotational energy generated in conjunction with activating the internal combustion engine of the vehicle automatically on one or more occasions in accordance with the fuel consumption plan; and
  use the stored rotational energy to aid acceleration of the vehicle.

8. A method of managing freshness of fuel in a vehicle, the method comprising:
  tracking a freshness level of a fuel in the vehicle as time passes;
  determining a fuel consumption plan based, at least in part, on a predetermined refueling schedule for the vehicle and the freshness level of the fuel in the vehicle;
  determining a predicted route of the vehicle while the vehicle is operating in a manual driving mode by analyzing at least one of historical driving patterns and user calendar data; and
  activating an internal combustion engine of the vehicle automatically on one or more occasions in accordance with the fuel consumption plan to consume at least a portion of the fuel, wherein a particular one of the one or more occasions is selected based, at least in part, on the predicted route of the vehicle.

9. The method of claim 8, wherein tracking the freshness level of the fuel in the vehicle includes measuring a time period that has elapsed since a most recent refueling of the vehicle.

10. The method of claim 8, wherein tracking the freshness level of the fuel in the vehicle is based on at least one of climate data and temperature-cycle data.

11. The method of claim 8, further comprising pre-heating the vehicle prior to a user's anticipated need for the vehicle on the particular one of the one or more occasions.

12. The method of claim 8, further comprising:
  receiving a predetermined route of the vehicle while the vehicle is operating in an autonomous driving mode; and
  activating the internal combustion engine of the vehicle on a particular one of the one or more occasions based, at least in part, on the predetermined route.

13. The method of claim 12, further comprising:
  identifying one or more portions of the predetermined route that require additional power compared with one or more other portions of the predetermined route; and
  activating the internal combustion engine of the vehicle during the one or more portions of the predetermined route that require additional power.

14. The method of claim 8, further comprising:
  determining a route of the vehicle to a refueling station;
  causing the vehicle, in an autonomous driving mode, to travel the determined route to the refueling station at a time that is in accordance with the predetermined refueling schedule; and
  causing the vehicle to refuel itself automatically at the refueling station.

15. The method of claim 8, further comprising:
  storing, in a thermal storage tank, heat energy generated in conjunction with activating the internal combustion engine of the vehicle automatically on one or more occasions in accordance with the fuel consumption plan; and
  using the stored heat energy to reduce a load on a heating, ventilation, and air conditioning (HVAC) system of the vehicle.

16. The method of claim 8, further comprising:
  storing, in a flywheel, rotational energy generated in conjunction with activating the internal combustion engine of the vehicle automatically on one or more occasions in accordance with the fuel consumption plan; and
  using the stored rotational energy to aid acceleration of the vehicle.

17. A non-transitory computer-readable medium for managing freshness of fuel in a vehicle and storing instructions that when executed by one or more processors cause the one or more processors to:
  track a freshness level of a fuel in the vehicle as time passes;
  determine a fuel consumption plan based, at least in part, on a predetermined refueling schedule for the vehicle and the freshness level of the fuel in the vehicle;
  determine a predicted route of the vehicle while the vehicle is operating in a manual driving mode by analyzing at least one of historical driving patterns and user calendar data; and
  activate an internal combustion engine of the vehicle automatically on one or more occasions in accordance with the fuel consumption plan to consume at least a portion of the fuel, wherein the instructions include instructions to select a particular one of the one or more occasions based, at least in part, on the predicted route of the vehicle.

* * * * *